Aug. 10, 1937.  P. J. FITZGERALD  2,089,254
GASKET
Filed Dec. 5, 1936
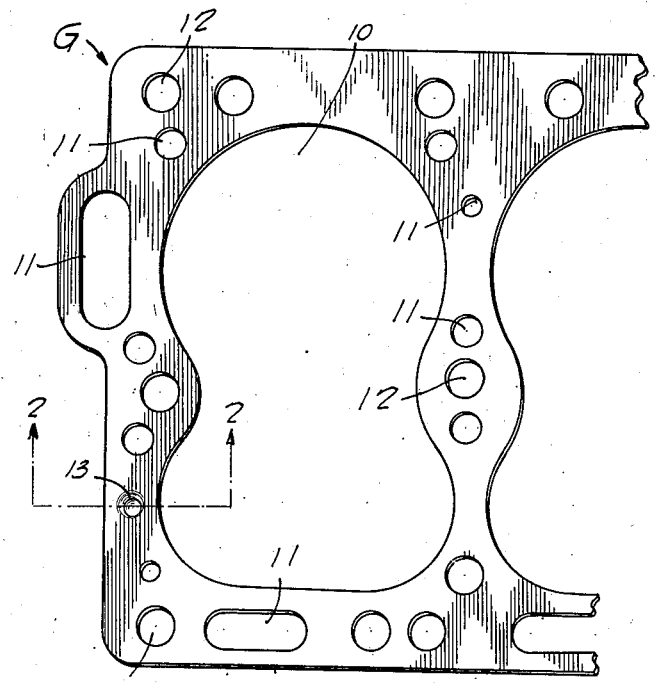
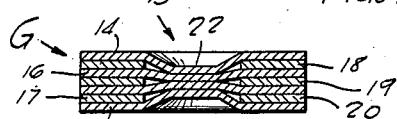
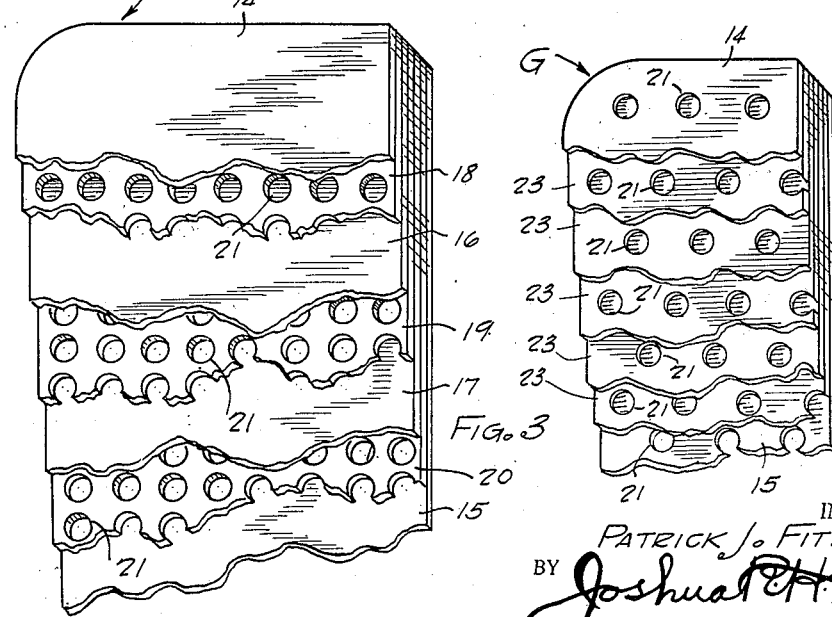
INVENTOR.
PATRICK J. FITZGERALD.
BY Joshua R. H. Potts
ATTORNEY.

Patented Aug. 10, 1937

2,089,254

UNITED STATES PATENT OFFICE 2,089,254

GASKET

Patrick J. Fitzgerald, Torrington, Conn., assignor to The Fitzgerald Manufacturing Company, Torrington, Conn., a corporation of Connecticut Application December 5, 1936, Serial No. 114,375

4 Claims. (Cl. 288—1)

This invention has to do with gaskets which are commonly known as cylinder head gaskets, and employed between the engine block and cylinder head of an internal combustion engine.

There has now developed a well crystallized practice of availing of a gasket at this point which conforms to the cross sectional shape of the engine block, and the gasket is provided with openings which correspond to the several openings in the engine block. Prior to this invention the practice has been to avail of a gasket which includes as essential elements a layer of fibrous material such as asbestos, and one or more layers of sheet metal. These sheet metal layers have been assembled with the fibrous layer in either one of two ways. There is either a layer of sheet metal embedded within the fibrous material, or a fibrous layer is clad by outer sheet metal layers.

In the patent application of Martin D. Fitzgerald, Serial Number 112,273, filed November 23, 1936 for a "Gasket" there are illustrated and described cylinder head gaskets of the type with which this invention is concerned, in which the gaskets are made up entirely of sheet metal layers which are assembled to provide laminated structures.

The present invention proposes to follow this departure from the conventional practice of making the laminated gasket of this type entirely of sheet metal. The invention has in view as an important objective the provision of a gasket of this type, in which at least one of the metallic layers is perforated to provide a plurality of openings throughout the extent of the gasket. In accordance with this invention these openings are to be fairly closely spaced, and when an adhesive is availed of between the several laminations this adhesive will be gathered in the openings with advantageous results.

The invention has in view as a further objective the provision of a gasket of the character above noted, in which a plurality of the sheet metal layers are perforated, as set forth in the preceding paragraph.

More in detail this invention proposes an arrangement in which alternate layers in the laminated structure are provided with the plurality of perforations which cooperate with the adhesive material to provide improved effects in the bonds between the several laminations.

The present invention also contemplates an arrangement in which each metallic layer throughout the entire structure is perforated in accordance with the above noted thoughts. With this arrangement a somewhat more refined objective lies in so arranging the several sheets that the perforations do not become aligned, as this invention contemplates a structure in which the perforations between adjacent sheets assume a staggered relationship.

These and other more detailed objects and advantages will in part become apparent, and in part be hereinafter stated, as the description of the invention proceeds.

The invention, therefore, comprises a cylinder head gasket which is made entirely from sheet metal, and which consists of a laminated structure in which certain or all of the layers are provided with a plurality of spaced perforations. Adhesive material is employed between the several laminations, and this adhesive material is carried in the perforations with improved results in the bond of the laminations.

For a full and more complete understanding of the invention, reference may be had to the following description and accompanying drawing wherein Figure 1 is a plan view of a portion of a cylinder head gasket made in accordance with the precepts of this invention, Figure 2 is an enlarged detailed view in section taken on the plane represented by the line 2—2 of Figure 1, Figure 3 is an enlarged detailed view in perspective with parts broken away and shown in section bringing out the arrangement of perforated parts, and Figure 4 is a view similar to Figure 2, showing a modified form in which all of the layers are perforated.

Referring now to the drawing wherein like reference characters denote corresponding parts, a portion of a cylinder head gasket is shown in Figure 1 as comprising laminated structure identified generally by the reference character G which is formed with the openings 10, which are intended to align with the cylinder openings in the engine block when a gasket is assembled therewith. Openings which correspond to the circulatory cooling system in the engine block are indicated at 11, and bolt holes are represented at 12. There is indicated at 13 a certain pressed metal structure which will later be described in detail, and which is availed of as a means for maintaining the several metallic sheets making up the gasket G in assembled relationship.

Referring now more particularly to Figure 2, the main body G of the gasket is shown as comprising outer metallic layers which may be of any suitable material, but which are preferably of a cold rolled steel. These outer steel layers are identified as 14 and 15.

In the form of the invention shown in Figures 2 and 3 there are also certain intermediate layers which may be of cold rolled steel, these being shown at 16 and 17. Interposed between the steel layers 14, 16, 17, and 15 are sheet metal layers of a different metal, such as copper. These are represented at 18, 19, and 20, and it is notable that the copper layers 18, 19, and 20 are provided with a plurality of small spaced perforations 21.

As shown in Figure 2, over the zone corresponding to the spot 13 of Figure 1 the copper layers 18, 19, and 20 are cut away, and the metal of the steel layers 14, 16, 17, and 15 is compressed in the zone defined by these cut away portions to assume the position shown in Figure 2, and these several steel layers may be connected together in some approved fashion, as by the welding represented at 22.

Prior to assembling the several steel and copper sections, this invention has in mind that the perforated copper layers 18, 19, and 20 be treated with appropriate adhesive material which will be nicely carried by the perforations 21. When the several sheets are assembled and compressed together in final form, the adhesive will be squeezed between the several sheets, and any excess returned to the perforations. As a result a good bond between the several laminations will inevitably result.

Referring now more particularly to the form of the invention shown in Figure 4, it is notable that both the outer steel sheets 14 and 15, as well as the intermediate sheets, whether they be copper or steel, and which are identified generally as 23, are provided with the perforations 21. It is well to note that the perforations 21 between adjacent sheets are not in alignment, but rather are staggered, as this provides for a more effective arrangement providing a solid unitary structure in the finished product.

While preferred specific embodiments of the invention are hereinbefore set forth, it is to be clearly understood that I am not to be limited to the exact constructions illustrated and described, because various modifications of these details may be provided in putting the invention into practice within the purview of the appended claims.

I claim:

1. A cylinder head gasket of the character described comprising a laminated structure made up entirely of a plurality of sheet metal layers in face to face metallic engagement, one of said sheet metal layers being provided with a plurality of spaced perforations, and an adhesive material applied to the perforated sheet.

2. A cylinder head gasket of the character described comprising a laminated structure made up of a plurality of sheet metal layers in face to face metallic engagement, alternate layers of said laminated structure being provided with spaced perforations, and an adhesive material applied between the several sheets.

3. A cylinder head gasket of the character described comprising a laminated structure made up of a plurality of sheet metal layers in face to face metallic engagement, each of said metal layers being formed with a plurality of small spaced perforations, and an adhesive material carried by the several sheet metal layers.

4. A cylinder head gasket of the character described comprising a laminated structure made up of a plurality of sheet metal layers, each of said metal layers being formed with a plurality of small spaced perforations, the perforations between adjacent sheets being staggered, and an adhesive material carried by the perforations of the sheets.

PATRICK J. FITZGERALD.